(12) United States Patent
Li (10) Patent No.: US 12,532,429 B2
(45) Date of Patent: Jan. 20, 2026

(54) CHASSIS WITH CHASSIS LOCK, AND OPENING/CLOSING METHOD

(71) Applicant: SUZHOU METABRAIN INTELLIGENT TECHNOLOGY CO., LTD., Jiangsu (CN)

(72) Inventor: Yunlong Li, Jiangsu (CN)

(73) Assignee: SUZHOU METABRAIN INTELLIGENT TECHNOLOGY CO., LTD, Jiangsu (CN)

( * ) Notice: Subject to any disclaimer, the term of this patent is extended or adjusted under 35 U.S.C. 154(b) by 110 days.

(21) Appl. No.: 18/565,316

(22) PCT Filed: Apr. 28, 2022

(86) PCT No.: PCT/CN2022/090022
§ 371 (c)(1),
(2) Date: Nov. 29, 2023

(87) PCT Pub. No.: WO2023/077752
PCT Pub. Date: May 11, 2023

(65) Prior Publication Data
US 2024/0268055 A1 Aug. 8, 2024

(30) Foreign Application Priority Data
Nov. 8, 2021 (CN) .......................... 202111310190.3

(51) Int. Cl.
*H05K 7/14* (2006.01)
*G06F 1/18* (2006.01)

(52) U.S. Cl.
CPC ........... *H05K 7/1489* (2013.01); *G06F 1/186* (2013.01)

(58) Field of Classification Search
CPC .. H05K 7/1489; H05K 7/1409; H05K 7/1411; H05K 5/0221; G06F 1/186; G06F 1/1679
(Continued)

(56) References Cited

U.S. PATENT DOCUMENTS 4,232,926 A * 11/1980 Inouye ................. H05K 7/1409
439/157
5,793,614 A * 8/1998 Tollbom ............... H05K 7/1409
361/801
(Continued)

FOREIGN PATENT DOCUMENTS

CN 101071321 A 11/2007
CN 201119159 Y 9/2008
(Continued)

OTHER PUBLICATIONS

PCT International Search Report mailed on Jul. 29, 2022 for PCT/CN2022/090022 (7 pages).
(Continued)

*Primary Examiner* — Christopher Garft
(74) *Attorney, Agent, or Firm* — Merchant & Gould P.C.

(57) ABSTRACT

The present disclosure relates to a chassis with a chassis lock, and an opening/closing method. The chassis is internally provided with a compartment sliding rail and a pull-out compartment, the pull-out compartment is slidably mounted on the compartment sliding rail, the chassis lock is provided between the compartment sliding rail and the pull-out compartment, a sliding rail through hole is provided in the compartment sliding rail; the chassis lock comprises a power-assisted wrench, the power-assisted wrench is hinged to the interior of the sliding rail through hole, a locking slider is slidably mounted on the power-assisted wrench, a locking hook is provided on the power-assisted wrench, a locking slot is formed between the locking hook and the locking slider; a compartment protrusion is provided at the bottom of the pull-out compartment, and the compartment protrusion enters or is detached from the locking slot.

20 Claims, 6 Drawing Sheets

(58) Field of Classification Search
USPC .................................................. 312/223.2
See application file for complete search history.

(56) References Cited

U.S. PATENT DOCUMENTS

| | | | |
|---|---|---|---|
| 6,174,007 B1* | 1/2001 | Schlack | E05B 13/10 |
| | | | 292/DIG. 31 |
| 6,721,172 B2* | 4/2004 | Katagiri | H05K 7/1409 |
| | | | 174/359 |
| 11,297,730 B1* | 4/2022 | Tsorng | H05K 7/1402 |
| 2004/0021325 A1* | 2/2004 | Schlack | E05C 1/065 |
| | | | 292/110 |
| 2008/0156754 A1 | 7/2008 | Cheng | |
| 2016/0018180 A1 | 1/2016 | Antell | |
| 2016/0120056 A1* | 4/2016 | Kuang | E05C 3/042 |
| | | | 403/322.4 |
| 2017/0202099 A1* | 7/2017 | Nguyen | E05B 65/02 |

FOREIGN PATENT DOCUMENTS

| | | | |
|---|---|---|---|
| CN | 102573375 A | 7/2012 | |
| CN | 102692976 A | 9/2012 | |
| CN | 105717996 A | 6/2016 | |
| CN | 107526404 A | 12/2017 | |
| CN | 207799573 U | 8/2018 | |
| CN | 212752791 U | 3/2021 | |
| CN | 113597188 A | 11/2021 | |
| CN | 113747723 A | 12/2021 | |

OTHER PUBLICATIONS

Chinese Search Report for Application No. 2021113101903 (2 pages).

* cited by examiner

Pull a power-assisted wrench with a hand, a locking hook of the power-assisted wrench providing an opening force to a pull-out compartment, such that a compartment protrusion is detached from a locking slot, thereby achieving an unlocking action between the pull-out compartment and the cabinet — s1

Push the pull-out compartment to move towards the interior of the cabinet, such that the compartment protrusion of the pull-out compartment is clamped into the locking slot, thereby achieving a locking action between the pull-out compartment and the cabinet — s2

Fig. 12

CHASSIS WITH CHASSIS LOCK, AND OPENING/CLOSING METHOD

CROSS-REFERENCE TO RELATED APPLICATION

The present application is a Section 371 National Stage Application of International Application No. PCT/CN2022/090022, filed on Apr. 28, 2022, which claims priority to and the benefit of Chinese patent application no. 202111310190.3, filed with the Chinese Patent Office on Nov. 8, 2021 and which applications are incorporated by reference in their entireties. To the extent appropriate, a claim of priority is made to each of the above disclosed applications.

TECHNICAL FIELD

The present disclosure relates to the technical field of servers and memories, and in particular, to a chassis with a chassis lock, and an opening/closing method.

BACKGROUND

With a rapid development of server and memory products, from the perspective of operation and maintenance, it is required that the whole machine design of the server and memory products may achieve rapid assembly, disassembly, and maintenance that are labor-saving.

Currently, most pull-out type chassis products on the market do not have a chassis lock, a connection between an inner compartment and the chassis is basically achieved by fixation by means of screws, and when components inside the chassis need to be maintained or replaced, a large number of screws need to be removed, and sometimes a side plate of the chassis and even the whole machine needs to be removed. Such an assembly and disassembly manner is too laborious and tedious, and the working efficiency is very low.

SUMMARY

According to a first solution of the present disclosure, a chassis with a chassis lock is provided. The chassis is internally provided with a compartment sliding rail and a pull-out compartment, the pull-out compartment is slidably mounted on the compartment sliding rail, the chassis lock is provided between the compartment sliding rail and the pull-out compartment, a sliding rail through hole is provided in the compartment sliding rail; the chassis lock includes a power-assisted wrench, the power-assisted wrench is hinged to an interior of the sliding rail through hole, a locking slider is slidably mounted on the power-assisted wrench, a locking hook is provided on the power-assisted wrench, a locking slot is formed between the locking hook and the locking slider; a compartment protrusion is provided at the bottom of the pull-out compartment, and the compartment protrusion enters or is detached from the locking slot.

In an example of the present disclosure, the compartment sliding rail is fixed on an inner wall of the chassis, the pull-out compartment is provided with a compartment slider, and the compartment slider is slidably mounted on the compartment sliding rail.

In an example of the present disclosure, a baffle is provided at one end of the compartment sliding rail, a first sliding rail positioning protrusion is provided at a first end of the bottom of the compartment sliding rail, and a first sliding rail positioning groove is provided at a second end of the bottom; a first end of the compartment slider is provided with a second sliding rail positioning groove, and a second end of the compartment slider is provided with a second sliding rail positioning protrusion, the first sliding rail positioning protrusion is snap-fitted with the second sliding rail positioning groove, and the first sliding rail positioning groove is snap-fitted with the second sliding rail positioning protrusion.

In an example of the present disclosure, the chassis lock further includes a housing, the housing includes a housing body and fixing portions, the fixing portions are fixed on the compartment sliding rail; the housing body is located in the sliding rail through hole, both sides of the housing body are provided with pin shaft holes, a pin shaft is provided on the power-assisted wrench, the pin shaft passes through the pin shaft holes to hinge the power-assisted wrench to the housing; and the chassis is provided with a chassis through hole at the position corresponding to the power-assisted wrench.

In an example of the present disclosure, limiting holes are provided on both sides of the middle of the housing body, the power-assisted wrench is provided with a second boss, wrench positioning protrusions are provided on both sides of the second boss, and the wrench positioning protrusions are snap-fitted with the limiting holes correspondingly.

In an example of the present disclosure, the power-assisted wrench is provided with a first boss, the first boss is provided with a sliding slot, the locking slider is slidably mounted in the sliding slot, a spring is provided between the locking slider and the sliding slot, and an inclined surface is provided on a side of the top of the locking slider away from the locking hook.

In an example of the present disclosure, an arc surface is provided on a side of the locking hook away from the locking slider.

According to a second solution of the present disclosure, an opening/closing method for a chassis is provided, wherein the method includes the steps of:

S1: pulling a power-assisted wrench, a locking hook of the power-assisted wrench providing an opening force to a pull-out compartment, such that a compartment protrusion is detached from a locking slot, thereby achieving an unlocking action between the pull-out compartment and the chassis; and S2: pushing the pull-out compartment to move towards the interior of the chassis, such that the compartment protrusion of the pull-out compartment is clamped into the locking slot, thereby achieving a locking action between the pull-out compartment and the chassis.

In an example of the present disclosure, step S1 may specifically include:

S11: pulling the power-assisted wrench to enable wrench positioning protrusions of the power-assisted wrench to be detached from limiting holes; and S12: continuing to pull the power-assisted wrench, the locking hook tightly abutting against the compartment protrusion, such that a first sliding rail positioning protrusion is detached from a second sliding rail positioning groove, and a second sliding rail positioning protrusion is detached from a first sliding rail positioning groove, and the locking hook providing an opening force to the pull-out compartment, thereby achieving an unlocking action of the pull-out compartment.

In an example of the present disclosure, step S2 may specifically include:

S21: pushing the pull-out compartment to move towards the interior of the chassis, such that the compartment protrusion at the bottom of the pull-out compartment approaches a chassis lock;

S22: the compartment protrusion first coming into contact with an inclined surface of a locking slider, and the compartment protrusion pressing down the inclined surface during the movement such that the locking slider moves towards the bottom inside a sliding slot; and S23: when the compartment protrusion continues to move and pass over the locking slider, the locking slider automatically returning to an initial position under an elastic force of a spring, such that the compartment protrusion is clamped into the locking slot, thereby achieving a locking action of the pull-out compartment.

BRIEF DESCRIPTION OF THE DRAWINGS

To describe the technical solutions in the examples of the present disclosure more clearly, the following briefly introduces the drawings required for describing the examples. Apparently, the drawings in the following description show merely some examples of the present disclosure, and persons of ordinary skill in the art may still derive other drawings from these drawings without inventive efforts.

DETAILED DESCRIPTION OF THE EMBODIMENTS

To make the objectives, technical solutions, and advantages of the present disclosure clearer, the following clearly and completely describes the technical solutions in the examples of the present disclosure with reference to the drawings in the examples of the present disclosure. Apparently, the examples to be described are merely some rather than all of the examples of the present disclosure. All other examples obtained by a person of ordinary skill in the art based on the examples of the present disclosure without inventive efforts shall belong to the scope of protection of the present disclosure.

Example I

With reference to FIG. 1 to FIG. 10, a chassis 1 is internally provided with a compartment sliding rail 11 and a pull-out compartment 2, the pull-out compartment 2 is slidably mounted on the compartment sliding rail 11, a chassis lock 3 is provided between the compartment sliding rail 11 and the pull-out compartment 2, a sliding rail through hole 12 is provided in the compartment sliding rail 11; the chassis lock 3 includes a power-assisted wrench 31, the power-assisted wrench 31 is hinged to an interior of the sliding rail through hole 12, a locking slider 32 is slidably mounted on the power-assisted wrench 31, a locking hook 33 is provided on the power-assisted wrench 31, a locking slot 4 is formed between the locking hook 33 and the locking slider 32; a compartment protrusion 21 is provided at the bottom of the pull-out compartment 2, and the compartment protrusion 21 enters or is detached from the locking slot 4.

When a user pushes the pull-out compartment 2 to move towards the chassis 1, the compartment protrusion 21 presses down the locking slider 32 during a movement; when the compartment protrusion 21 continues to move and pass over the locking slider 32, the locking slider 32 returns to an initial position under an elastic force of a spring, such that the compartment protrusion 21 is clamped into the locking slot 4, and thus the pull-out compartment 2 is locked in the chassis 1. When the user needs to open the pull-out compartment 2 for maintenance, the user pulls, for example, with a hand, the power-assisted wrench 31, such that the locking hook 33 tightly abuts against the compartment protrusion 21, and provides an opening force to the compartment protrusion 21, the pull-out compartment 2 moves out of the chassis 1 for a certain distance, and then the user may remove the pull-out compartment 2, without needing to remove and install screws; moreover, an opening force may be provided to the pull-out compartment 2, such that the user may open the pull-out compartment 2 with less effort, improving the operability for maintenance of a whole machine, and making the maintenance simple and convenient. In addition, the chassis 1 is made of an aluminium alloy material, which is relatively light, has a certain hardness, may satisfy the requirements of the chassis, and is relatively attractive and has a better texture than a traditional chassis. The compartment sliding rail 11 is made of a nylon material, and the pull-out compartment 2 is made of a stainless steel material, which may save costs while satisfying a sliding action. The position of the chassis lock 3 may be arranged on a side surface of the chassis 1 according to the specific situations of the server and memory products.

Figure 1:
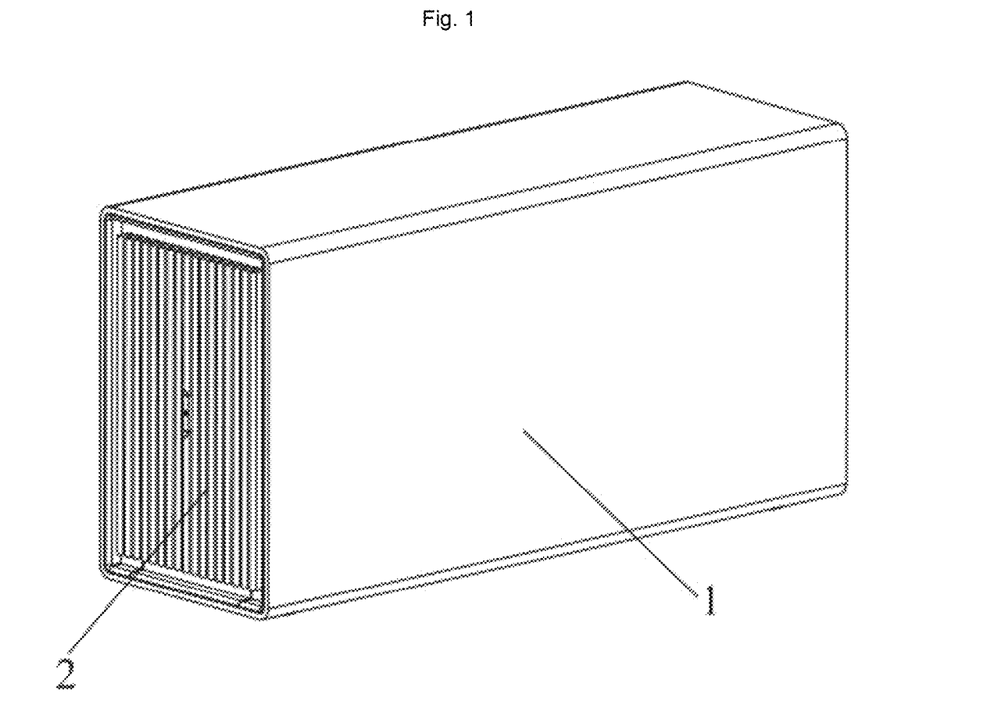
FIG. 1 is a schematic structural diagram of a chassis and a pull-out compartment in normal use in Example I of the present disclosure.
Figure 2:
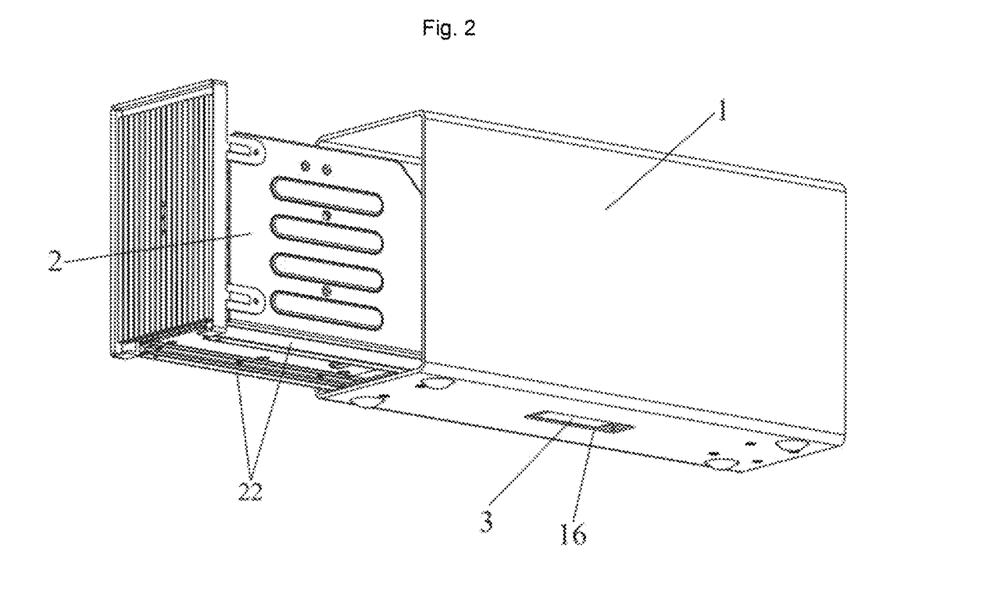
FIG. 2 is a schematic structural diagram of the pull-out compartment pulled out of the chassis in Example I of the present disclosure.
Figure 3:
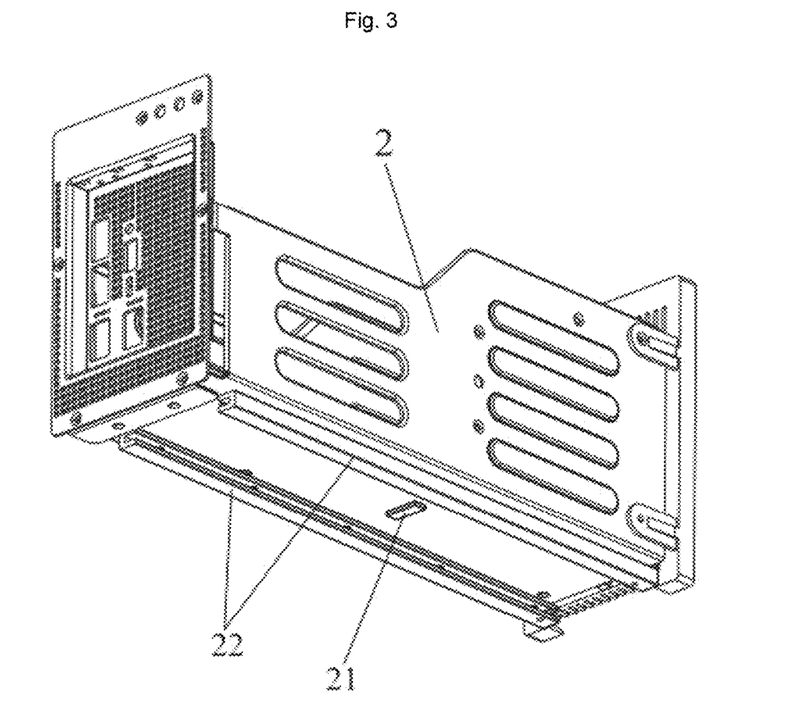
FIG. 3 is a schematic structural diagram of the pull-out compartment in Example I of the present disclosure.
Figure 4:
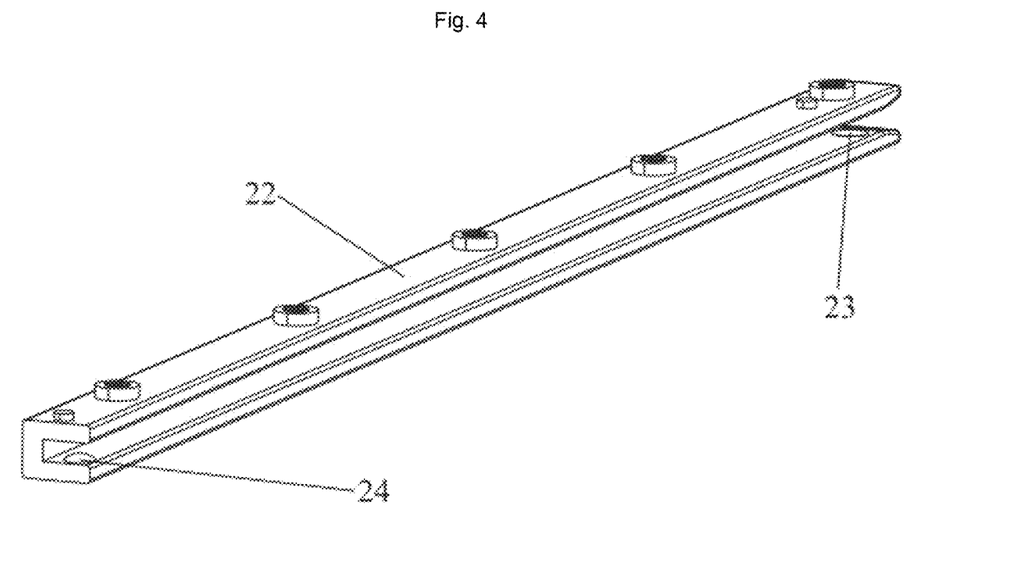
FIG. 4 is a schematic structural diagram of a compartment slider of the pull-out compartment in Example I of the present disclosure.
Figure 5:
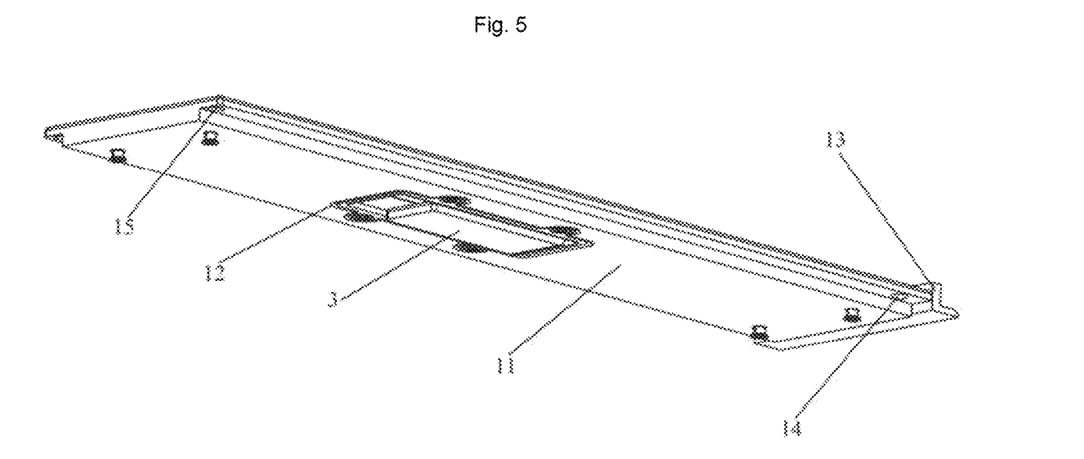
FIG. 5 is a schematic structural diagram of a compartment sliding rail in Example I of the present disclosure.

In one of the embodiments, the compartment sliding rail 11 is fixed on an inner wall of the chassis 1, the pull-out compartment 2 is provided with a compartment slider 22, and the compartment slider 22 is slidably mounted on the compartment sliding rail 11.

The compartment slider 22 is slidably mounted on the compartment sliding rail 11, such that the compartment slider 22 may slide on the compartment sliding rail 11. As the compartment slider 22 is fixedly mounted to the pull-out compartment 2 and the compartment sliding rail 11 is fixedly mounted to the chassis 1, the pull-out compartment 2 may slide relative to the chassis 1, and when components inside the chassis 1 need to be replaced, the pull-out compartment 2 may be directly pulled out, facilitating subsequent maintenance.

In one of the embodiments, a baffle 13 is provided at one end of the compartment sliding rail 11, a first sliding rail positioning protrusion 14 is provided at a first end of the bottom of the compartment sliding rail 11, and a first sliding rail positioning groove 15 is provided at a second end of the bottom; a first end of the compartment slider 22 is provided with a second sliding rail positioning groove 23, and a second end of the compartment slider 22 is provided with a second sliding rail positioning protrusion 24, the first sliding rail positioning protrusion 14 is snap-fitted with the second sliding rail positioning groove 23, and the first sliding rail positioning groove 15 is snap-fitted with the second sliding rail positioning protrusion 24.

When the pull-out compartment 2 and the chassis 1 are in a locked state, that is, when the compartment protrusion 21 is located in the locking slot 4, there is still a certain gap between the compartment protrusion 21 and the locking slot 4, thus the pull-out compartment 2 may still shake to a certain extent, and therefore the pull-out compartment 2 and the compartment sliding rail 11 further need to be limited by means of the protrusions and the grooves, which has a double position limiting effect on the pull-out compartment 2. Similar to the position limiting between the power-assisted wrench 31 and the housing 34, surfaces of the first sliding rail positioning protrusion 14 and the second sliding rail positioning protrusion 24 are arc surfaces, the first sliding rail positioning protrusion 14 is clamped in the second sliding rail positioning groove 23, and the second sliding rail positioning protrusion 24 is clamped in the first sliding rail positioning groove 15, so as to limit the pull-out compartment 2 relative to the chassis body, thereby preventing the pull-out compartment 2 from generating a large movement in the chassis 1. In addition, during the process of locking the pull-out compartment 2 with the chassis 1, the pull-out compartment 2 may move excessively due to an external force on the pull-out compartment 2, and therefore a baffle 13 is provided at a tail end of the compartment sliding rail 11 to prevent the pull-out compartment 2 from moving excessively due to the external force.

Figure 6:
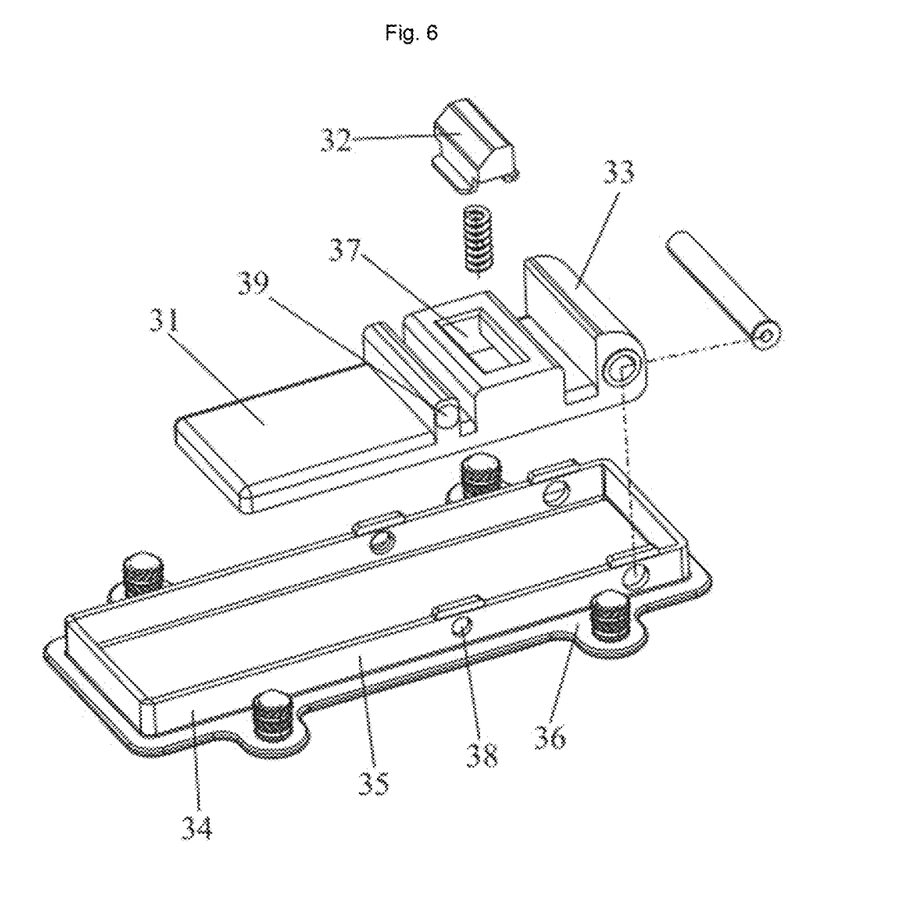
FIG. 6 is a schematic exploded structural diagram of a chassis lock in Example I of the present disclosure.

In one of the embodiments, the chassis lock 3 further includes a housing 34, the housing 34 includes a housing body 35 and fixing portions 36, the fixing portions 36 are fixed on the compartment sliding rail 11; the housing body 35 is located in the sliding rail through hole 12, both sides of the housing body 35 are provided with pin shaft holes, a pin shaft is provided on the power-assisted wrench 31, the pin shaft passes through the pin shaft holes to hinge the power-assisted wrench 31 to the housing 34; and the chassis 1 is provided with a chassis through hole 16 at the position corresponding to the power-assisted wrench 31.

The housing 34 of the chassis lock 3 is fixed on the compartment sliding rail 11 by screws, the housing body 35 is located in the sliding rail through hole 12 of the compartment sliding rail 11, both sides of the housing body 35 are provided with pin shaft holes, and the pin shaft passes through the pin shaft holes to form a hinged structure. In this way, the power-assisted wrench 31 may rotate around the hinge shaft relative to the housing 34, such that the power-assisted wrench 31 may provide an opening force conveniently to the pull-out compartment 2 when rotating, thereby facilitating easy removal of the pull-out compartment 2 from the chassis 1. The chassis through hole 16 accommodates the rotatable power-assisted wrench 31, and facilitates the user pulling the power-assisted wrench 31 from the outside of the chassis 1.

In one of the embodiments, limiting holes 38 are provided on both sides of the middle of the housing body 35, the power-assisted wrench 31 is provided with a second boss, wrench positioning protrusions 39 are provided on both sides of the second boss, and the wrench positioning protrusions 39 are snap-fitted with the limiting holes 38 correspondingly.

When there is no need to remove the pull-out compartment 2 from the chassis 1, in order to ensure that the power-assisted wrench 31 does not rotate, it is necessary to limit the power-assisted wrench 31, so as to prevent the power-assisted wrench 31 from rotating due to its own gravity of the power-assisted wrench 31 or other reasons, because the rotation of the power-assisted wrench 31 will cause a problem that failure of the locking action between the pull-out compartment 2 and the chassis 1. The wrench positioning protrusions 39 have an arc surface, and a maximum distance between the wrench positioning protrusions 39 on both sides of the power-assisted wrench 31 is greater than a distance between inner walls of the housing 34 corresponding thereto. Thus, when the wrench positioning protrusions 39 are clamped into the limiting holes 38 correspondingly, the power-assisted wrench 31 will not be automatically detached from the limiting holes 38 if no force or a very small acting force is applied to the power-assisted wrench 31, thereby achieving positioning of the power-assisted wrench 31. Only when the pull-out compartment 2 needs to be removed, a corresponding acting force is applied to the power-assisted wrench 31, such that the power-assisted wrench 31 may be detached from the limiting holes 38, it is convenient to maintain the pull-out compartment 2.

In one of the embodiments, the power-assisted wrench 31 is provided with a first boss, the first boss is provided with a sliding slot 37, the locking slider 32 is slidably mounted in the sliding slot 37, a spring is provided between the locking slider 32 and the sliding slot 37, and an inclined surface is provided on a side of the top of the locking slider 32 away from the locking hook 33.

The locking slider 32 may move in the sliding slot 37, and as a spring is provided between the locking slider 32 and the sliding slot 37, when the compartment protrusion 21 passes over the locking slider 32, the locking slider 32 may automatically return to the initial position under the elastic force of the spring, such that the locking slider 32 and the locking hook 33 may form a locking slot 4, facilitating locking the compartment protrusion 21 by the locking slot 4. The bottom of the sliding slot 37 is provided with a hole for mounting the spring, which is used for preventing a problem of the spring tilts caused by moving when the spring is compressed by a force; a cylinder is provided at the bottom of the locking slider 32, the cylinder penetrates through the spring, which prevents the spring from tilting when being compressed by a force; the length of the cylinder needs to be designed according to actual situations, so as to avoid the situation where a locking action may not be completed because the locking slider 32 may not slide to a desired position due to interference between the cylinder and the bottom of the sliding slot 37 when the locking slider 32 moves if the cylinder is too long. A hook is provided at an edge portion of the locking slider 32, and when the locking slider 32 is mounted in the sliding slot 37, due to the presence of the hook, the hook constrains the locking slider 32 from be detached due to the elastic force of the spring. The locking slider 32 is made of a plastic material. In this way, the locking slider 32 is light, and a load of the spring is small. The locking slider 32 is easy and convenient to move, thereby facilitating achieving a locking action for the compartment protrusion 21 by the locking slot 4. When the compartment protrusion 21 comes into contact with the locking slider 32, in order to enable the locking slider 32 to effectively slide downwards under a horizontal pushing force of the compartment protrusion 21, an inclined surface is provided on the side of the top of the locking slider 32 away from the locking hook 33, such that the locking slider 32 may be subjected to a downward acting force from the compartment protrusion 21, further enabling the locking slider 32 to normally slide downwards inside the sliding slot 37. A chamfer may be provided at the bottom of the compartment protrusion 21, such that the compartment protrusion 21 is effectively matched with the inclined surface of the locking slider 32, and the locking slider 32 effectively slides downwards inside the sliding slot 37.

In one of the embodiments, an arc surface is provided on the side of the locking hook 33 away from the locking slider 32.

The locking hook 33 is a key component for providing a force for assistance. When the user pulls the power-assisted wrench 31, in order to prevent the locking hook 33 from interfering with the bottom of the pull-out compartment 2 when rotating around the hinge shaft, rounding is performed on the side of the locking hook 33 away from the locking slider 32, such that the locking hook 33 does not interfere with the bottom of the pull-out compartment 2 when rotating around the hinge shaft, thereby further enabling the locking hook 33 to normally implement the force assistance function.

Compared with a prior art, the technical solution of the chassis of the present disclosure has the following advantages:

According to the chassis with the chassis lock, and an opening/closing method in the present disclosure, a slidable connection is achieved between the pull-out compartment and the chassis, and in subsequent maintenance, the pull-out compartment may be directly pulled out of the chassis so as to facilitate replacement of components inside the pull-out compartment, and avoiding a problem of removing and installing screws in the prior art. The chassis lock is provided between the pull-out compartment and the chassis, the locking slot is formed between the locking slider and the locking hook of the chassis lock, and by means of the matching between the compartment protrusion of the pull-out compartment and the locking slot, unlocking and locking actions between the pull-out compartment and the chassis are achieved; moreover, an opening force is provided to the compartment protrusion by a power-assisted wrench of the chassis lock, such that the pull-out compartment may be opened more conveniently and with less effort, thereby improving the maintenance efficiency, and simplifying the maintenance procedure.

Example II

Figure 11:
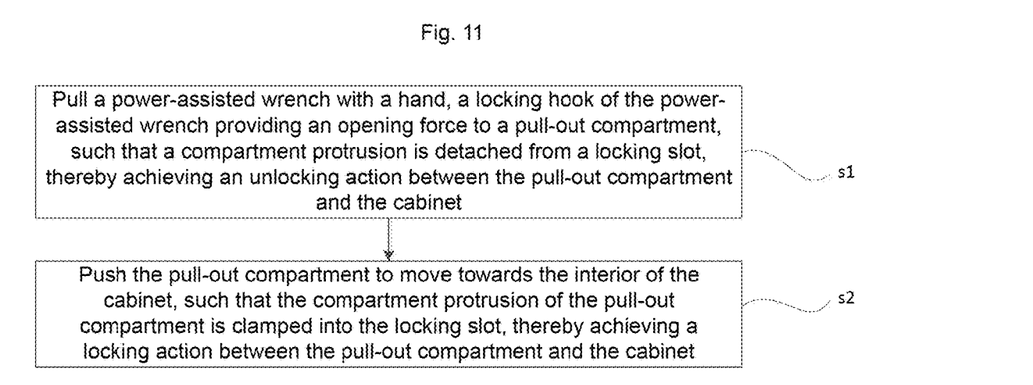
FIG. 11 is a first flow chart of the opening/closing method for the chassis lock in Example II of the present disclosure.

Referring to FIG. 11, FIG. 11 is a first flow chart of an opening/closing method for the chassis in Example II of the present disclosure, wherein the method specifically includes steps of:

S1: pulling, for example, with a hand, the power-assisted wrench 31, the locking hook 33 of the power-assisted wrench 31 providing an opening force to the pull-out compartment 2, such that the compartment protrusion 21 is detached from the locking slot 4, thereby achieving an unlocking action between the pull-out compartment 2 and the chassis 1;

wherein when the pull-out compartment 2 needs to be removed from the chassis 1 for maintenance, the user pulls the power-assisted wrench 31, the power-assisted wrench 31 rotates around the hinge shaft, a lever mechanism is formed among the wrench, the hinge shaft and the locking hook 33, and when the power-assisted wrench 31 rotates, the locking hook 33 tightly abuts against the compartment protrusion 21 and provides the opening force to the compartment protrusion 21 for enabling the compartment protrusion 21 to move outwards, such that the compartment protrusion 2 is removed from the chassis 1; and S2: pushing the pull-out compartment 2 to move towards the interior of the chassis 1, such that the compartment protrusion 21 of the pull-out compartment 2 is clamped into the locking slot 4, thereby achieving a locking action between the pull-out compartment 2 and the chassis 1, wherein when the maintenance of the pull-out compartment 2 is finished, the pull-out compartment 2 needs to be moved into the chassis 1; in this case, the user pushes the pull-out compartment 2 to move towards the interior of the chassis 1, the compartment protrusion 21 of the pull-out compartment 2 moves towards the interior of the chassis 1 along with the pull-out compartment 2, and when the compartment protrusion 21 presses down the inclined plane of the locking slider 32 and passes over the locking slider 32, the locking slider 32 automatically returns to the initial position, the compartment protrusion 21 is located in the locking slot 4 at this time, and the locking action between the pull-out compartment 2 and the chassis 1 is completed.

Figure 10:
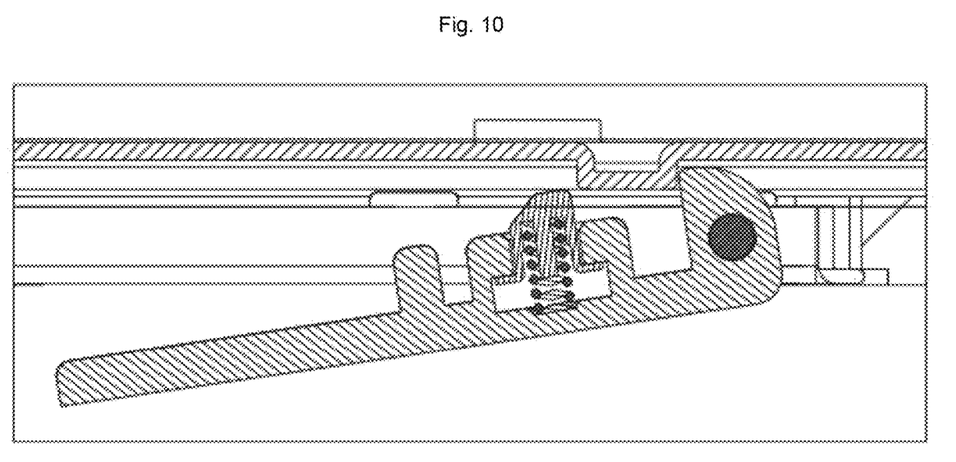
FIG. 10 is a schematic diagram of an unlocked state according to the opening/closing method for the chassis lock in Example II of the present disclosure.
Figure 12:
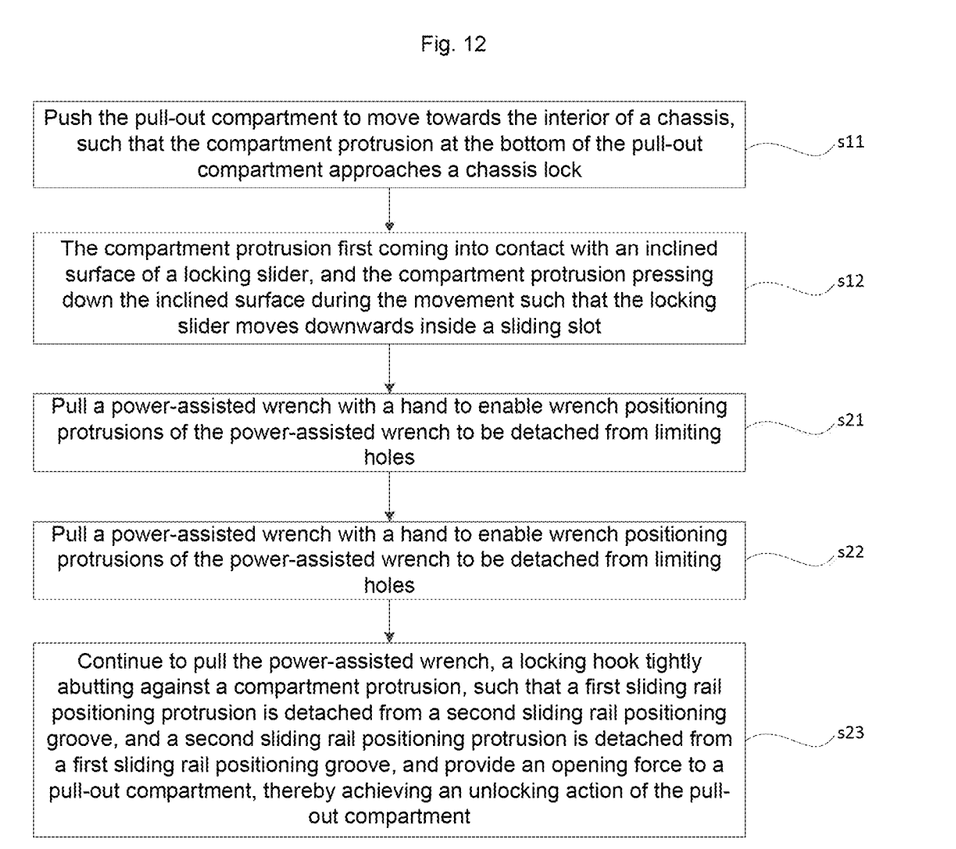
FIG. 12 is a second flow chart of the opening/closing method for the chassis lock in Example II of the present disclosure.

In one of the embodiments, as shown in FIG. 12, FIG. 12 is a second flow chart of an opening/closing method for the chassis in Example II of the present disclosure, wherein step S1 specifically includes:

S11: pulling, for example, with a hand, the power-assisted wrench 31 to enable wrench positioning protrusions 39 of the power-assisted wrench 31 to be detached from limiting holes 38;

wherein when the pull-out compartment 2 needs to be pulled out of the chassis 1, the user pulls the power-assisted wrench 31 with the hand to apply a certain acting force, such that the protrusions of the power-assisted wrench 31 may be detached from the limiting holes 38, and the power-assisted wrench 31 is further pulled, such that the locking hook 33 may be rotated by the lever structure; and S12: continuing to pull the power-assisted wrench 31, the locking hook 33 tightly abutting against the compartment protrusion 21, such that the first sliding rail positioning protrusion 14 is detached from the second sliding rail positioning groove 23, and the second sliding rail positioning protrusion 24 is detached from the first sliding rail positioning groove 15, and providing an opening force to the pull-out compartment 2, thereby achieving the unlocking action of the pull-out compartment 2;

wherein the user continues to pull the power-assisted wrench 31 with the hand, the rotation of the locking hook 33 on the other end around the hinge shaft may be achieved by the lever structure, and when the surface of the locking hook 33 close to the compartment protrusion 21 comes into contact with the compartment protrusion 21, the power-assisted wrench 31 is further pulled, and the locking hook 33 tightly abuts against the compartment protrusion 21. As shown in FIG. 10, the power-assisted wrench 31 continues to be pulled, and a corresponding acting force is applied, such that the locking hook 33 provides an acting force to the compartment protrusion 21 to enable the compartment protrusion 21 to move to the outside of the chassis 1; at this time, the first sliding rail positioning protrusion 14 is detached from the second sliding rail positioning groove 23, and the second sliding rail positioning protrusion 24 is detached from the first sliding rail positioning groove 15; and the user pulls the pull-out compartment 2 with the hand to allow the pull-out compartment 2 to be removed from the chassis 1, facilitating the maintenance of relevant components.

Figure 7:
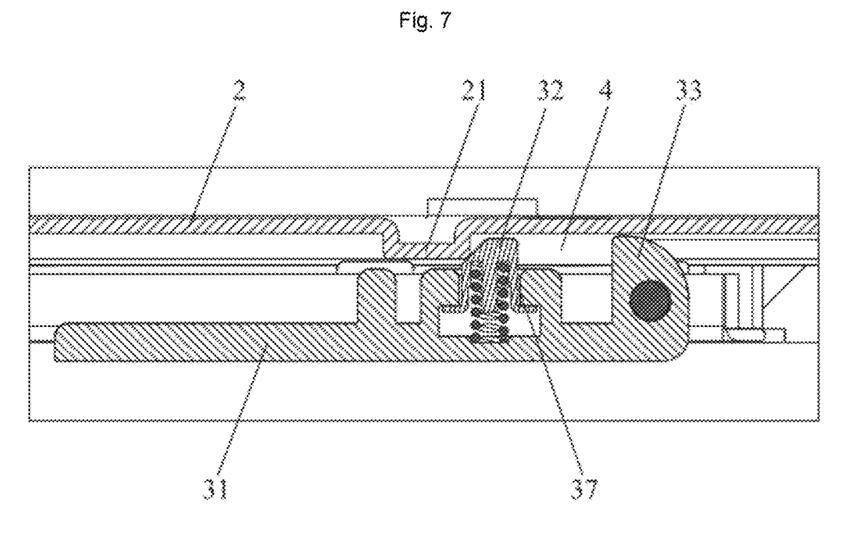
FIG. 7 is a schematic diagram of a first locked state according to an opening/closing method for a chassis lock in Example II of the present disclosure.
Figure 8:
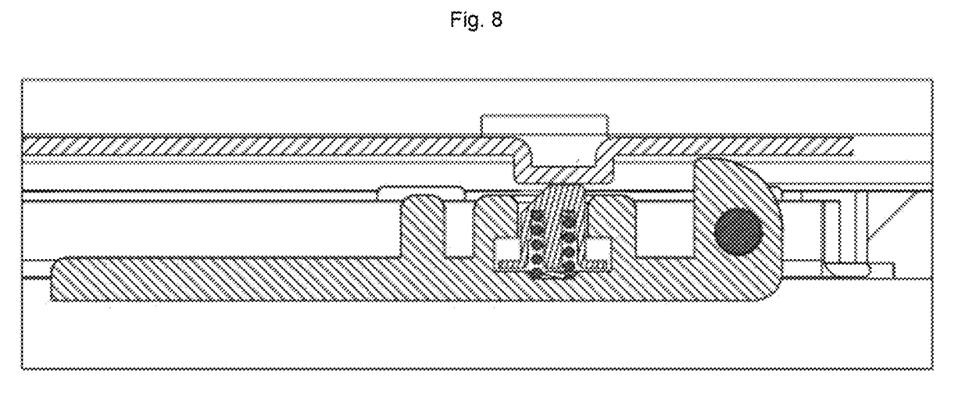
FIG. 8 is a schematic diagram of a second locked state according to the opening/closing method for the chassis lock in Example II of the present disclosure.
Figure 9:
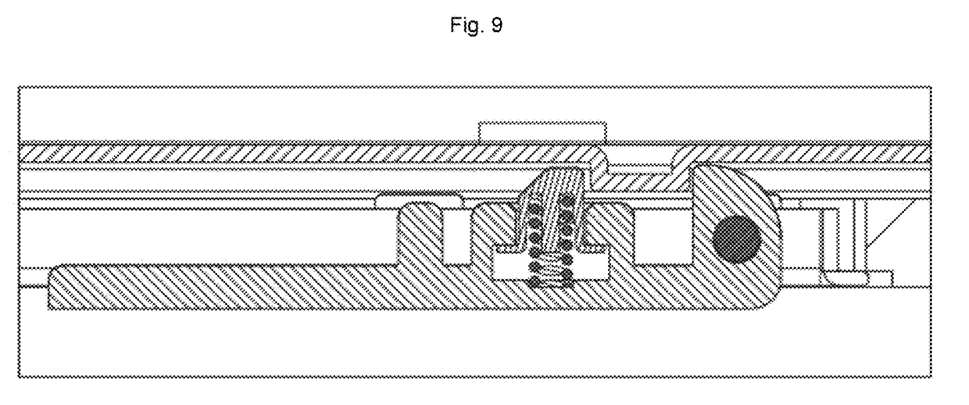
FIG. 9 is a schematic diagram of a third locked state according to the opening/closing method for the chassis lock in Example II of the present disclosure.

In one of the embodiments, as shown in FIG. 12, step S2 specifically includes:

S21: pushing the pull-out compartment 2 to move towards the interior of the chassis 1, making the compartment protrusion 21 at the bottom of the pull-out compartment 2 approaches the chassis lock 3;

wherein when a maintenance of the pull-out compartment 2 is finished, the user pushes the pull-out compartment 2 such that the pull-out compartment 2 moves towards the interior of the chassis 1, the compartment protrusion 21 moves towards the interior of the chassis 1 along with the pull-out compartment 2, and the pull-out compartment 21 further moves towards the chassis lock 3, so as to achieve the locking action between the chassis 1 and the pull-out compartment 2;

S22: the compartment protrusion 21 first coming into contact with an inclined surface of a locking slider 32, and the compartment protrusion 21 pressing down the inclined surface during the movement such that the locking slider 32 moves downwards inside the sliding slot 37;

wherein when the compartment protrusion 21 approaches the chassis lock 3, as shown in FIG. 7, the compartment protrusion 21 first comes into contact with the inclined surface of the locking slider 32, and as the compartment protrusion 21 further moves, the compartment protrusion 21 presses down the inclined surface of the locking slider 32, the locking slider 32 moves downwards inside the sliding slot 37 along with the horizontal movement of the compartment protrusion 21, and the spring in the locking slider 32 is compressed; and S23: when the compartment protrusion 21 continues to move and pass over the locking slider 32, the locking slider 32 automatically returning to the initial position under the elastic force of the spring, such that the compartment protrusion 21 is clamped into the locking slot 4, thereby achieving the locking action of the pull-out compartment 2;

wherein when the compartment slider 22 moves such that the locking slider 32 slides into place inside the sliding slot 37, as shown in FIG. 8, the compartment slider 22 further moves such that the compartment slider 22 passes over the locking slider 32; and when the compartment slider 22 passes over the locking slider 32, the locking slider 32 moves towards the top of the sliding slot 37 under the elastic force of the spring, such that the locking slider 32 returns to the initial position, as shown in FIG. 9, that is, the locking slider 32 slides to the top inside the sliding slot 37, and at this time, the compartment slider 22 is located in the locking slot 4 formed by the locking slider 32 and the locking hook 33, thereby achieving the locking action of the pull-out compartment 2 relative to the chassis 1.

It should be noted that the above are only some examples of the present disclosure and technical principles applied thereto. Those skilled in the art will appreciate that the present disclosure is not limited to the specific examples described herein, and various obvious variations, rearrangements, and substitutions may be made to those skilled in the art without departing from the scope of the present disclosure. Therefore, although the present disclosure is described in detail through the above examples, the present disclosure is not limited to the above examples, and may further include other equivalent examples without departing from the concept of the present disclosure, and the scope of the present disclosure is determined by the scope of the appended claims.

REFERENCE SIGN LIST 1. chassis
11. compartment sliding rail
12. sliding rail through hole
13. baffle
14. first sliding rail positioning protrusion
15. first sliding rail positioning groove
16. chassis through hole
2. pull-out compartment
21. compartment protrusion
22. compartment slider
23. second sliding rail positioning groove
24. second sliding rail positioning protrusion
3. chassis lock
31. power-assisted wrench
32. locking slider
33. locking hook
34. housing
35. housing body
36. fixing portion
37. sliding slot
38. limiting hole
39. wrench positioning protrusion
4. locking slot

What is claimed is:

1. A chassis with a chassis lock, wherein the chassis is internally provided with a compartment sliding rail and a pull-out compartment, the pull-out compartment is slidably mounted on the compartment sliding rail, the chassis lock is provided between the compartment sliding rail and the pull-out compartment, a sliding rail through hole is provided in the compartment sliding rail; the chassis lock comprises a power-assisted wrench, the power-assisted wrench is hinged to an interior of the sliding rail through hole, a locking slider is slidably mounted on the power-assisted wrench such that the locking slider slides relative to the power-assisted wrench, a locking hook is provided on the power-assisted wrench, a locking slot is formed between the locking hook and the locking slider; a compartment protrusion is provided at the bottom of the pull-out compartment, and the compartment protrusion enters or is detached from the locking slot.

2. The chassis with the chassis lock according to claim 1, wherein the compartment sliding rail is fixed on an inner wall of the chassis, the pull-out compartment is provided with a compartment slider, and the compartment slider is slidably mounted on the compartment sliding rail.

3. The chassis with the chassis lock according to claim 2, wherein a baffle is provided at an end of the compartment sliding rail, a first sliding rail positioning protrusion is provided at a first end of the bottom of the compartment sliding rail, and a first sliding rail positioning groove is provided at a second end of the bottom; a first end of the compartment slider is provided with a second sliding rail positioning groove, and a second end of the compartment slider is provided with a second sliding rail positioning protrusion, the first sliding rail positioning protrusion is snap-fitted with the second sliding rail positioning groove, and the first sliding rail positioning groove is snap-fitted with the second sliding rail positioning protrusion.

4. The chassis with the chassis lock according to claim 1, wherein the chassis lock further comprises a housing, the housing comprises a housing body and fixing portions, the fixing portions are fixed on the compartment sliding rail; the housing body is located in the sliding rail through hole, both sides of the housing body are provided with pin shaft holes, a pin shaft is provided on the power-assisted wrench, the pin shaft passes through the pin shaft holes to hinge the power-assisted wrench to the housing (34); and the chassis is provided with a chassis through hole at the position corresponding to the power-assisted wrench.

5. The chassis with the chassis lock according to claim 4, wherein limiting holes are provided on both sides of the middle of the housing body, the power-assisted wrench is provided with a second boss, wrench positioning protrusions are provided on both sides of the second boss, and the wrench positioning protrusions are snap-fitted with the limiting holes correspondingly.

6. The chassis with the chassis lock according to claim 1, wherein the power-assisted wrench is provided with a first boss, the first boss is provided with a sliding slot, the locking slider is slidably mounted in the sliding slot, a spring is provided between the locking slider and the sliding slot, and an inclined surface is provided on a side of the top of the locking slider away from the locking hook.

7. The chassis with the chassis lock according to claim 1, wherein an arc surface is provided on a side of the locking hook away from the locking slider.

8. An opening/closing method for the chassis according to claim 1, wherein the method comprises the steps of:
   S1: pulling the power-assisted wrench, the locking hook of the power-assisted wrench providing an opening force to the pull-out compartment, such that the compartment protrusion is detached from the locking slot, thereby achieving an unlocking action between the pull-out compartment and the chassis; and
   S2: pushing the pull-out compartment to move towards the interior of the chassis, such that the compartment protrusion of the pull-out compartment is clamped into the locking slot, thereby achieving a locking action between the pull-out compartment and the chassis.

9. The opening/closing method according to claim 8, wherein step S1 specifically comprises:
   S11: pulling the power-assisted wrench to enable wrench positioning protrusions of the power-assisted wrench to be detached from limiting holes; and
   S12: continuing to pull the power-assisted wrench, the locking hook tightly abutting against the compartment protrusion, such that a first sliding rail positioning protrusion is detached from a second sliding rail positioning groove, and a second sliding rail positioning protrusion is detached from a first sliding rail positioning groove, and the locking hook providing an opening force to the pull-out compartment, thereby achieving an unlocking action of the pull-out compartment.

10. The opening/closing method according to claim 8, wherein step S2 specifically comprises:
    S21: pushing the pull-out compartment to move towards the interior of the chassis, such that the compartment protrusion at the bottom of the pull-out compartment approaches a chassis lock;
    S22: the compartment protrusion first coming into contact with an inclined surface of a locking slider, and the compartment protrusion pressing down the inclined surface during the movement such that the locking slider moves towards the bottom inside a sliding slot; and
    S23: in respond to the compartment protrusion continues to move and pass over the locking slider, the locking slider automatically returning to an initial position under an elastic force of a spring, such that the compartment protrusion is clamped into the locking slot, thereby achieving a locking action of the pull-out compartment.

11. The chassis with the chassis lock according to claim 1, wherein the chassis is made of an aluminium alloy material, the compartment sliding rail is made of a nylon material, and the pull-out compartment is made of a stainless steel material.

12. The chassis with the chassis lock according to claim 3, wherein surfaces of the first sliding rail positioning protrusion and the second sliding rail positioning protrusion are arc surfaces, the first sliding rail positioning protrusion is clamped in the second sliding rail positioning groove, and the second sliding rail positioning protrusion is clamped in the first sliding rail positioning groove.

13. The chassis with the chassis lock according to claim 1, wherein a baffle is provided at a tail end of the compartment sliding rail to prevent the pull-out compartment from moving excessively due to an external force.

14. The chassis with the chassis lock according to claim 4, wherein the power-assisted wrench is rotatably accommodated in the chassis through hole.

15. The chassis with the chassis lock according to claim 5, wherein the wrench positioning protrusions have an arc surface, and a maximum distance between the wrench positioning protrusions on both sides of the power-assisted wrench is greater than a distance between inner walls of the housing corresponding thereto.

16. The chassis with the chassis lock according to claim 6, wherein the bottom of the sliding slot is provided with a hole for mounting the spring, a cylinder is provided at the bottom of the locking slider, the cylinder penetrates through the spring.

17. The chassis with the chassis lock according to claim 6, wherein a hook is provided at an edge portion of the locking slider, and in respond to the locking slider is mounted in the sliding slot, the hook constrains the locking slider from be detached due to an elastic force of the spring.

18. The chassis with the chassis lock according to claim 1, wherein a chamfer is provided at the bottom of the compartment protrusion.

19. The chassis with the chassis lock according to claim 1, wherein rounding is performed on a side of the locking hook away from the locking slider.

20. The chassis with the chassis lock according to claim 1, wherein the power-assisted wrench rotates around a hinge shaft, a lever mechanism is formed among the power-assisted wrench, the hinge shaft and the locking hook, and in response to the power-assisted wrench rotating, the locking hook tightly abuts against the compartment protrusion and provides an opening force to the compartment protrusion for enabling the compartment protrusion to move outwards.

\* \* \* \* \*